(12) United States Patent
Gidron et al.

(10) Patent No.: US 7,283,811 B2
(45) Date of Patent: Oct. 16, 2007

(54) SYSTEM AND METHOD FOR AGGREGATION OF USER APPLICATIONS FOR LIMITED-RESOURCE DEVICES

(75) Inventors: Yoad Gidron, Yokneam Illit (IL); Ophir Holder, Haifa (IL); Haim Teicholtz, Hadera (IL)

(73) Assignee: Lucent Technologies Inc., Murray Hill, NJ (US)

( * ) Notice: Subject to any disclaimer, the term of this patent is extended or adjusted under 35 U.S.C. 154(b) by 379 days.

(21) Appl. No.: 09/987,514

(22) Filed: Nov. 15, 2001

(65) Prior Publication Data

US 2002/0142760 A1 Oct. 3, 2002

Related U.S. Application Data

(60) Provisional application No. 60/270,638, filed on Feb. 23, 2001.

(51) Int. Cl.
*H04M 3/42* (2006.01)
(52) U.S. Cl. .................. 455/414.1; 379/88.23
(58) Field of Classification Search ........... 455/411, 455/412.1, 414.1; 707/1; 717/173; 709/231; 379/88.12, 88.18, 88.23, 412.1, 411, 414.1, 379/414.2, 414.3, 414.4
See application file for complete search history.

(56) References Cited

U.S. PATENT DOCUMENTS

| | | | | |
|---|---|---|---|---|
| 5,430,719 A | * | 7/1995 | Weisser, Jr. | 370/389 |
| 6,496,979 B1 | * | 12/2002 | Chen et al. | 717/178 |
| 6,591,095 B1 | * | 7/2003 | Palaniswamy et al. | 455/411 |
| 6,701,521 B1 | * | 3/2004 | McLlroy et al. | 717/173 |
| 6,757,530 B2 | * | 6/2004 | Rouse et al. | 455/412.1 |
| 2002/0065067 A1 | * | 5/2002 | Khare et al. | 455/414 |
| 2004/0014459 A1 | * | 1/2004 | Shanahan | 455/414.1 |
| 2004/0058673 A1 | * | 3/2004 | Irlam et al. | 455/412.1 |

\* cited by examiner

*Primary Examiner*—Gerald Gauthier

(57) ABSTRACT

A system and a method for directed provisioning and management of user applications on limited resource devices by a content provider, through an integrated platform which handles all aspects of aggregation and management of such applications. By "content aggregation", it is meant the procedure by which applications are introduced by a content provider, and are then aggregated into a service for provision by that content provider and/or service provider. Preferably, the collected applications may then be examined by the user according to a content directory, which is a hierarchical organization of different applications according to one or more categories and/or attributes. The service provider preferably controls access to the content or user applications by the user, for example according to a subscription of the user and/or capabilities of the limited resource device of the user.

20 Claims, 3 Drawing Sheets submission of
content
(stage 1)

transmission of content
to "verifying" state
(stage 2)

testing of content
(stage 3)

approval of content
(stage 4)

enabling access to
content
(stage 5)

SYSTEM AND METHOD FOR AGGREGATION OF USER APPLICATIONS FOR LIMITED-RESOURCE DEVICES

This Application claims priority from U.S. Provisional Application No. 60/270,638, filed on Feb. 23, 2001, which is hereby incorporated by reference as if fully set forth herein.

FIELD OF THE INVENTION

The present invention relates to a system and a method for aggregation of user applications for limited-resource devices, and in particular, to such a system and method in which applications are aggregated into a service for provision by a service provider. Examples of suitable devices include, but are not limited to, cellular telephones and handheld computers. These devices are "limited-resource devices" in that computational resources such as memory, storage space and/or data processing capabilities are limited, particularly in comparison to other computational devices such as PCs (personal computers), for example.

BACKGROUND OF THE INVENTION

Cellular telephones have recently become increasingly popular for mobile voice communication, as well as for the exchange of text messages and other types of data. For voice communication, cellular telephone systems provide similar services as the fixed, wire-based telephony system, or PSTN (public switched telephony network), except that cellular telephone systems are based upon signal transmission through radio frequency signals rather than wires. Hence, cellular telephones are also termed "wireless telephones", and communication over such telephones is termed "wireless communication".

One advantage of cellular telephones is that they permit mobile communication, such that subscribers are able to communicate while traveling, or otherwise when they are not at a fixed physical location. In addition, cellular telephones permit subscribers to be contacted regardless of the location of the subscribers. These advantages of mobile communication are also useful for the exchange of data, such as for text messages and even Web pages, for example. Cellular telephones are able to receive text messages through message exchange protocols such as SMS (short message service), for example, which permit one-to-one communication between cellular telephones through text messages. In addition, the WAP (wireless application protocol) protocol enables cellular telephones, which are WAP-enabled to receive Web pages. Thus, cellular telephones potentially provide a full communication solution for all of the different types of electronic communication for a subscriber.

However, cellular telephones have a number of disadvantages over other types of computational devices which are used to exchange data, such as desktop computers, for example. Cellular telephones have limited resources, and as such can be considered to be limited resource devices. They are limited by at least one of available memory, storage space, size of the display screen, and/or computational power, as represented by the ability to perform various data processing tasks. These limitations are imposed by the requirements of portability, convenient and simple operation, battery lifetime, weight and size. In addition, the type of limitations and the hardware specifications of each cellular telephone, or other related handheld device, also differ between, cellular telephone service providers and even manufacturers. Thus, designing a single type of application which is suitable for all cellular telephones, for example, is clearly very difficult.

In addition, the heterogeneity of this computational environment extends to the types of communication protocols according to which these different cellular telephones communicate for data transmission. As described above, two of these protocols include SMS, for character-based messages only, and WAP, for more rich data transmissions which may also include graphics. Other protocols include "I-mode", the packet-based cellular telephone data transmission protocol of the Japanese carrier, NTT DoCoMo (Japan).

Unlike the static content which is delivered through WAP or I-mode, the Java 2 Micro Edition (J2ME) provides a platform for the execution of dynamic content on mobile devices. J2ME is a reduced edition of the popular Java programming language (originally developed by Sun Microsystems), which was adapted to the limitations of consumer and embedded devices. It is being defined as an industry standard by companies which manufacture limited resource devices, such as Motorola, Nokia and Palm.

Another emerging standard is the Mobile Station Application Execution Environment (MExE), which is defined by the Third Generation Partnership Project (3GPP). MExE provides a standardized execution environment in a mobile station, as well as the ability of the mobile station to negotiate supported capabilities with a MExE service provider, thereby allowing applications to be developed across different platforms. Thus, the capabilities of different cellular telephones and other limited resource devices can be accommodated by a particular application.

This last attempted solution, MExE, is the closest attempt to the provision of an integrated platform for delivering applications to a wide variety of cellular telephones and other limited resource devices. However, MExE still suffers from the drawbacks of lacking a specification or support for a server architecture or specific management functions, both of which are required in order to actually deliver the applications to different limited resource devices. Furthermore, all of the above solutions focus on either a method for creating a user application for operation by a limited resource device, such as the modified version of Java; or a method for delivering and displaying content on the limited resource device, such as WAP. They do not provide an integrated solution for creating the user application; adapting the application according to the different requirements of different limited resource devices; and delivering the application to the device through a client-server system which is compatible with such devices, particularly for wireless communication. In addition, these systems do not provide a solution to the problem of at least semi-automatically collecting the applications for conversion into a service for provision to the limited resource device.

SUMMARY OF THE INVENTION

The background art does not teach or suggest a system and a method for providing user applications for limited resource devices by a service provider, in which the process of collecting the applications from content providers and then aggregating such applications into a service is at least partially automated.

The present invention overcomes these deficiencies of the background art by providing a system and a method for directed provisioning of user applications to limited resource devices, through an integrated platform which handles all aspects of aggregation and management of such applications. Preferably, the integrated platform is able to perform, or at least to support the performance of, user application development, submission, publication, subscription and delivery to the limited resource device. In addition, the integrated platform more preferably enables applications which have been adjusted to the characteristics of the specific user device to be properly selected and delivered.

According to preferred embodiments of the present invention, a service provider performs aggregation and management of user applications on limited resource devices by a service provider, through the integrated platform which handles all aspects of aggregation and management of such applications. By "content aggregation", it is meant the procedure by which applications are introduced by a content provider, and are then aggregated into a service for provision by the service provider.

Hereinafter, the term "limited-resource device" refers to a computational device in which computational resources such as memory, storage space, network bandwidth and/or data processing capabilities are limited, particularly in comparison to desktop computers such as PCs (personal computers), for example.

According to the present invention, there is provided a method for provisioning a user application by a service provider for delivery to a limited resource device through an integrated platform, the steps of the method comprising: (a) creating the user application by the content provider; (b) examining the user application by the integrated platform; (c) if the user application is accepted, publishing the user application by the integrated platform.

According to another embodiment of the present invention, there is provided a system for providing a user application, the system comprising: (a) a limited resource device for receiving the user application; (b) a content provider for creating the user application; and (c) a service provider for examining the user application, and if the user application is accepted, publishing the user application for being received by the limited resource device.

According to still another embodiment of the present invention, there is provided a method for aggregating a user application for delivery to a limited resource device by a service provider, the limited resource device having at least one characteristic, the method comprising: submitting the user application to the service provider; determining at least one rule for controlling the user application; altering at least one function of the user application according to the at least one characteristic of the limited resource device; and customizing the user application according to the at least one rule by the service provider.

According to yet another embodiment of the present invention, there is provided a method for provisioning a user application by a content provider for delivery to a limited resource device, the method comprising: providing a service provider for delivering the user application to the limited resource device; creating the user application by the content provider; determining at least one characteristic of the user application by content provider; submitting the user application to the service provider by the content provider, wherein at least one of creating the user application, determining the at least one characteristic of the user application, and submitting the user application is controlled by at least one rule determined by the service provider; and aggregating the user application by the service provider.

Hereinafter, the term "network" refers to a connection between any two or more computational devices which permits the transmission of data.

Hereinafter, the term "cellular telephone" refers to any type of wireless handset or device which is capable of voice and data transfer through a radio frequency signal, optionally through a connection to the PSTN (public switched telephone network).

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

In addition, the present invention could be implemented as software, firmware or hardware, or as a combination thereof. For any of these implementations, the functions performed by the method could be described as a plurality of instructions performed by a data processor.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
FIG. 1 is a flowchart of an exemplary basic workflow for the integrated creation, aggregation and provisioning of user applications to limited resource devices according to the present invention.
Figure 1:
Figure 1:
Figure 1:

The present invention is of a system and a method for directed provisioning of user applications on limited resource devices by a content provider, through an integrated platform which handles all aspects of aggregation and management of such applications. By "content aggregation", it is meant the procedure by which applications are introduced by a content provider, and are then aggregated into a service for provision by a service provider. Preferably, the collected applications may eventually be discovered by the user who wishes to download such an application according to a content directory, which is a hierarchical organization of different applications according to one or more categories and/or attributes.

The process of collecting the applications for conversion to one or more services is preferably at least partially automated, and is more preferably determined according to one of a plurality of rules. These rules are part of a policy for managing the submission of applications, and also their transmission to the limited resource device as one or more services.

As used herein, the term "user application" refers to a unit of dynamic content and/or to a set of instructions for execution by the limited resource (user) device, possibly interacting with a server side application across the network. The content may optionally include any type of media, including but not limited to, any one of audio data, video data, graphic images and text, or a combination thereof Preferably, the user application includes such a set of instructions for execution by the device, which optionally and more preferably are written in a interpreted language such as Java, for example. However, the user application optionally and most preferably also features one or more components of a user interface, for example in order to select a particular set of instructions and/or type of content.

Therefore, the integrated platform of the present invention is able to provide an end-to-end solution for managing the workflow of creating, aggregating and publishing user applications for provisioning to the limited resource devices of the users. The workflow starts with the creation of the user applications by the content provider. The service provider then tests the submitted user applications, which may be rejected or approved. Some of the tests are optionally and preferably performed automatically by the system while others are optionally and preferably performed manually by the administrator. The actual set of tests is preferably determined by the service provider and may optionally vary from one content provider to another. If approved, the user applications are published and may then be enabled. Optionally, the user applications may only be enabled for certain users, for example as a function of subscription service. For other users, these applications may be disabled.

The principles and operation of the present invention may be better understood with reference to the drawings and the accompanying description.

Referring now to the drawings, FIG. 1 is a flowchart of an exemplary basic workflow for the integrated creation, aggregation and provisioning of user applications to limited resource devices according to the present invention. The workflow is based on states and transitions, in which the state is a tag that describes the current stage of the content item in the workflow. The transitions define the mechanism by which a content item moves from state to state, and are preferably determined according to dynamic rules. The infrastructure of the integrated platform preferably enables a number of elements to be defined, including but not limited to, the set of states and actions, and the set of transition rules.

The set of actions is optionally and more preferably defined as being selected from manual (performed by the user), pre-defined processing (performed by the system) or user-defined processing (also performed by the system, according to the direction of the user). Each rule is optionally and more preferably composed of the following elements: source state, or the state in which the rule is applicable; trigger for activating the rule which is the execution of an action; condition which may be present in order for the rule to be true or false, and which is checked against the properties of the content item and system-level information (may be empty); true state, which is the new state of the content if the condition is met; and false state, which is the new state of the content if the condition is not met. With regard to the trigger, if the action is automatic and/or a trigger is not specified, preferably the rule is executed upon entering the source state.

Turning now to FIG. 1, as shown in stage 1, the content is submitted by the content provider to the service provider, at which point the content is in the "submitted" state. The content is preferably associated with various attributes in various languages. These attributes are more preferably used for classifying and delivering the content at later stages. The content provider can also optionally specify a charging scheme that is to be used for charging subscribers for consuming the content.

Transitions from the "submitted" state are as follows. The content may optionally be updated by the content provider and left in the submitted state. Preferably, the "process" transition is performed by the service provider, in order to move the content to the "verifying" state, as shown in stage 2.

During the "verifying" state, the content is preferably validated through various automatic checks/examinations, such as certification validation, size checking, various conventions, matching to target devices, and so forth. Some of these checks are provided by the system and others can be defined by the service provider. If one of the checks fails, the content preferably moves to the Rejected state. Alternatively, if the content successfully passes these checks/examinations, the content preferably moves to the "testing" state, as shown in stage 3.

In the "testing" state, manual tests are preferably performed by the service operator through emulation tools or real devices, in order to determine whether the content behaves as predicted when delivered to the limited-resource devices of the users. In this stage, the service operator is more preferably able to examine the actual functionality and behavior of the content before it becomes available to subscribers. In addition, the charging scheme is optionally and more preferably reviewed, optionally with modifications.

The possible transitions from this state are preferably to the "approved" state if the content receives approval from the service provider, as shown in stage 4. Alternatively, the content is rejected by the service provider and then moves to the "rejected" state.

Turning to stage 4, once the content is in the "approved" state, the service provider is preferably able to publish the content for access to users, for example to eligible subscribers. More preferably, when the content is published, it is associated with one or more categories. Categories are nodes in the content directory. Each category represents a folder of other categories or applications. This repository is also termed taxonomy.

After publication, as shown in stage 5, the content is in the "enabled" state, from which the content may optionally be discovered and downloaded by subscribers. The content is optionally placed into the "disabled" state by a manual action or according to at least one dynamic rule, for example according to the date and/or the number of downloads.

The following table is intended as a non-limiting example only of a set of rules that can be defined for a specific service provider.

| Source State | Trigger | Condition | True State | False State |
| --- | --- | --- | --- | --- |
| N/A | Submit | | Submitted | |
| Submitted | Update | | Submitted | |
| Submitted | Process | | Verifying | |
| Verifying | | Content size <= 50 KB | Verifying | Rejected |
| Verifying | Validate matching to target device | Content is valid | Testing | Rejected |
| Testing | Approve | | Approved | |
| Testing | Reject | | Rejected | |
| Approved | Publish | | Enabled | |
| Enabled | Disable | | Disabled | |
| Enabled | Download | Download count < 500 | Enabled | Disabled |
| Disabled | Enable | | Enabled | |

Figure 2:
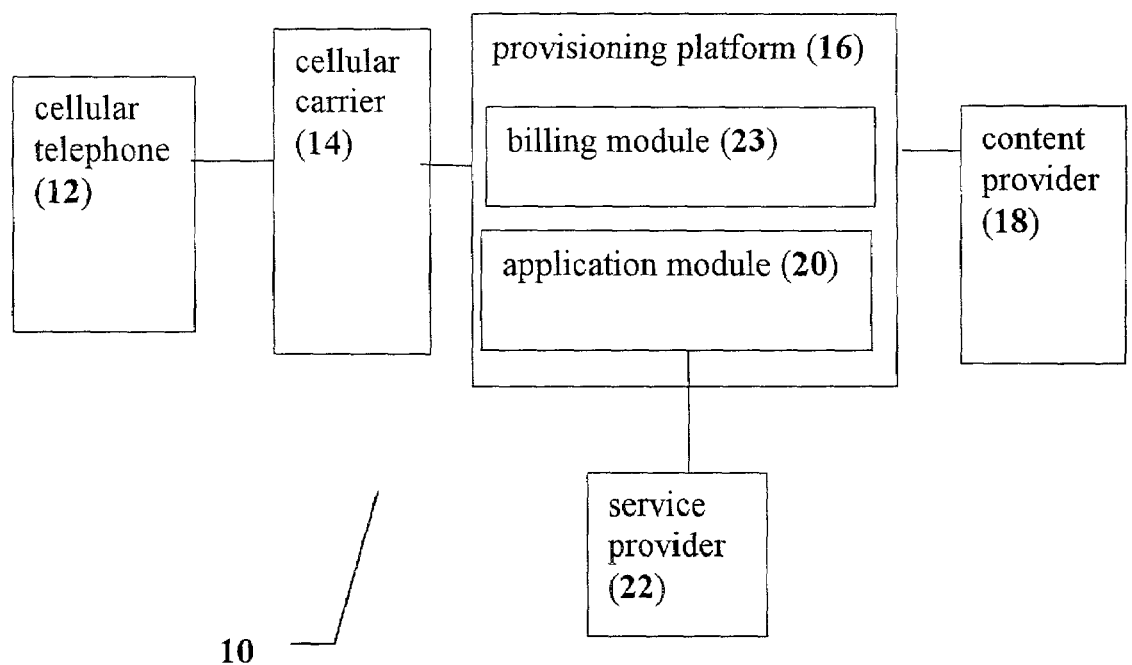
FIG. 2 is a schematic block diagram of an exemplary system according to the present invention.

FIG. 2 is a schematic block diagram of an exemplary but preferred implementation of a system according to the present invention with regard to application creation for, and delivery to, limited resource devices, including a mechanism for billing the user for consuming the content at the limited resource device. The present invention is described with regard to cellular telephones as the limited resource devices, it being understood that this is for the purposes of illustration only and is not intended to be limiting in any way. The described system is an example only of a suitable system for performing the flow of operations described with regard to FIG. 1 above.

As shown, a system 10 features a cellular telephone 12, operated by a user (not shown), who subscribes to a cellular carrier 14. Cellular carrier 14 typically provides a number of different services through cellular telephone 12, including, but not limited to, voice communication and data transmission. Cellular carrier 14 may also include other types of functions, provided through a variety of different hardware and/or software components, as is well known in the art.

For the purposes of the present invention, cellular carrier 14 is also in communication with a provisioning platform 16 according to the present invention. As described in greater detail below, provisioning platform 16 features a number of different components, for the creation of user applications which are adaptable to a variety of devices such as cellular telephone 12; for the delivery of such applications to cellular telephone 12, and optionally other devices, preferably only as required or "on-demand"; and for optionally receiving such applications from third party content providers.

With regard to the last feature, provisioning platform 16 is preferably in communication with a content provider 18. Content provider 18 preferably actually submits each such user application to an application repository 20 of provisioning platform 16, which is managed by service provider 22. This process is described with regard to stage 1 of FIG. 1 as the "submitted" state. Once the content has been validated by service provider 22 (as described with regard to stages 2 and 3 of FIG. 1), then the content may optionally be published by service provider 22 (as described with regard to stage 4 of FIG. 1).

Each user application, more preferably with any required and/or preferred modifications or specific implementations, may then be transmitted to cellular telephone 12 and/or another limited resource device (not shown), as described with regard to stage 5 of FIG. 1. Optionally and most preferably, the user subscribes to any particular user application through cellular carrier 14, in order to receive such an application through cellular telephone 12.

According to preferred embodiments of the present invention, the procedure for providing such a user application through system 10 is preferably performed as follows. This description is of an illustrative process which may be performed by using the components of system 10, and which may optionally also be incorporated within, or otherwise combined with, the flow of operations described in FIG. 1 above.

As described with regard to FIG. 2, first the user application itself is preferably developed, for example by a third party such as content provider 18. More preferably, the user application is created through an API (application programming interface) and set of tools according to the present invention, as described in greater detail below. In addition, preferably content provider 18 is required to register in advance, before the user application may be submitted. More preferably the registration process includes the submission of such information as the name and contact information for content provider 18, which in turn more preferably receives a user name and password.

Next, content provider 18 preferably submits a new user application to service provider 22, which manages such user applications. This procedure for submitting a new user application is preferably performed according to a standardized application submission protocol. For example, optionally and more preferably content provider 18 is able to submit the application through a plurality of paths, including but not limited to, uploading the file from the system of content provider 18 itself to service provider 22; uploading the file from a system which is external to content provider 18; and providing an external link, or URL, for the file by content provider 18. In the latter situation, more preferably service provider 22 is able to then automatically download the file, and/or to download the file upon request from content provider 18. Content provider 18 also more preferably defines such features of the application as "flavors" and attributes (see below for a description) and/or different human languages. For example, content provider 18 could optionally specify different versions of the application to be automatically downloaded according to the location of cellular telephone 12.

Next, service provider 22 preferably uses a set of tools according to the present invention in order to inspect and certify the submitted applications. Optionally and most preferably, the application is also submitted with any other meta-information which may be required by another component of system 10, such as pricing scheme and delivery information, for example.

If the user application is found to be suitable, service provider 22 then preferably approves and publishes the new application. Publication enables the new user application to be available to user devices such as cellular telephone 12 for example. Publication is preferably performed by placing the user application in application repository 20, for delivery to cellular telephone 12.

According to preferred embodiments of the present invention, an application which is currently being examined by service provider 22, and/or an accepted application for which a new version is available, may optionally be replaced by a submission of a new application version by content provider 18.

After publication, application repository 20 then optionally and more preferably organizes the user applications into a dynamic application content directory, which contains information about the available applications. This directory is most preferably organized by using a service package implementation, which defines various concepts and structures for distributing content according to various service packages. Optionally, such distribution may also include features for supporting financial remuneration, for example through subscriptions and/or "pay per usage" models in which separate payment is required for each application, as described in greater detail below.

With such a directory, applications are optionally and preferably organized into a hierarchical structure of categories and sub-categories, and are also more preferably associated with attributes. A "category" is therefore preferably a portion of the content directory, which maps applications to a hierarchical structure. A category may optionally contain sub-categories or applications. A specific sub-category and/or application may optionally and more preferably be reached from several paths in the directory, such that the specific sub-category and/or application is optionally and more preferably shared by a plurality of categories in the directory. Such sharing enables the user to locate the desired sub-category/application from multiple paths.

In this model, an application itself may be considered to be a node in the content directory, the node thereby representing a specific application. The application node more preferably includes all attributes which are needed to deliver the application to the device, for searching and for filtering. The step of filtering is more preferably performed with different filters and/or tools according to the present invention, which are preferably provided in order to customize the user applications according to the requirements and/or requests of end users, and also to manage the directories themselves, as described in greater detail below with regard to FIG. 2. Filtering may optionally be performed according to the supported limited-resource devices, languages and user eligibility for content.

Another optional but preferable feature of the directory is an application flavor node, which preferably represents a specific variation of the application. Each such variation is optionally and more preferably stored in a single JAR (Java archive) file. Each application may optionally have a plurality of flavors, with each flavor more preferably containing attributes for defining the supported limited-resource devices and languages of the flavor. Optionally and more preferably, the service provider (such as service provider of FIG. 3) is able to define the range of flavors which can be submitted by content provider 18, for example according to the languages and devices which are supported by the network of the specific cellular carrier. Although a specific JAR is preferably able to support a plurality of languages and devices, more preferably, a separate JAR is required for each flavor of the application.

Another preferred embodiment of the content directory is an external category, which optionally and more preferably represents a URL or other link to an external system, or any system which is separate from application repository 20.

Also optionally, different service packages may also be associated with different categories and/or sub-categories. Preferably, the content directory is then filtered according to a particular service package, such that each user only views application(s) and/or sub-categories which are suitable for the particular service package to which the user is subscribed. Other optional but preferred types of filtering include, but are not limited to, personalization of the content directory by the user. Thus, each user is preferably able to view a different content structure while browsing through application repository 20, which is tailored to their preferences.

Optionally and preferably, content provider 18 may alter the status of any application which is stored in application repository 20, for example by causing the application to become "canceled". In this state, the application should then be deleted from application repository 20. Alternatively, content provider 18 may choose to have the application "disabled" or not available to users.

Optionally and preferably, the user must be eligible to receive a particular user application in order to receive such a user application through cellular telephone 12. For example, the user could optionally have some type of subscription, to a particular application but more preferably to a category or type of application, or even to any such application available through cellular carrier 14, as well as variations thereof. Subscription is optionally and preferably performed through cellular carrier 14.

Billing for these subscriptions, as well as for other types of payment models, is then optionally and preferably performed through a billing module 23, which is optionally and more preferably located at provisioning platform 16. Billing module 23 determines a charge for consuming certain types of content by cellular telephone 12, optionally and more preferably according to a plurality of rules. In addition, subscriptions are preferably supported by a repository of subscriber information, which is part of provisioning platform 16. The repository of subscriber information contains information about different users and their preferences.

Figure 3:
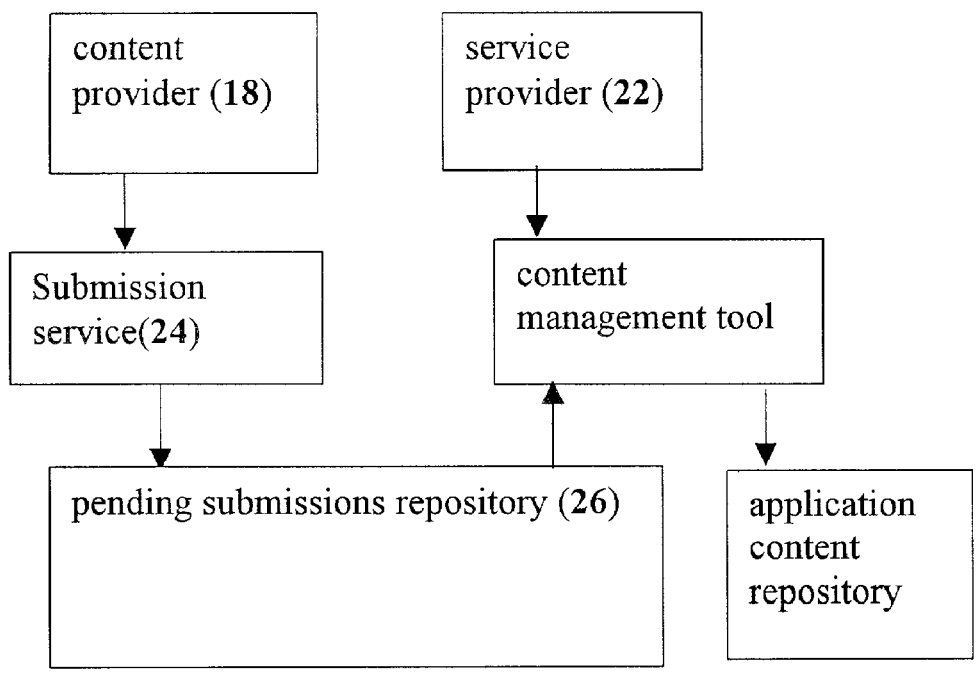
FIG. 3 is a schematic block diagram of exemplary tools according to the present invention.
Figure 3:
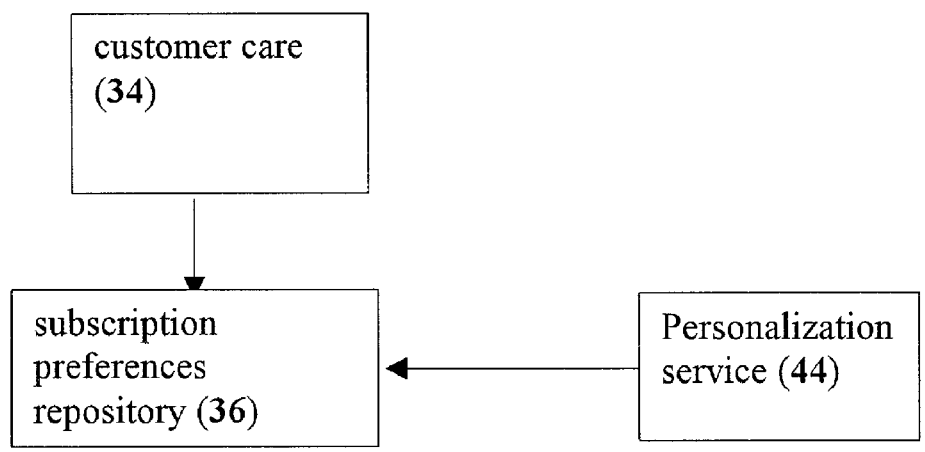

FIG. 3 is a schematic block diagram according to the present invention, showing a more detailed description of various components related to the publication of, and subscription to, user applications. As shown, again content provider 18 submits the user application through a submission service 24 to a pending submission repository 26. Pending submission repository 26 then preferably holds the user application until it is approved by service provider 22.

As previously described, service provider 22 optionally and more preferably is able to review and analyze the proposed user application through automated verification processes and manual testing, from pending submission repository 26. Once service provider 22 has approved the user application, service provider 22 more preferably publishes the user application. The published application is preferably placed in an application content repository 32, which is preferably contained within application module 20 (not shown; see FIG. 2).

Service provider 22 is able to manage content through a content management tool 29. Content management tool 29 preferably enables service provider 22 to manage content provider 18 and/or the submitted application, for example optionally including verification processes as previously described.

Optionally and more preferably, in order to support the preferred subscription implementation of the present invention, a user is able to subscribe to a particular class or category of such applications, through the customer care system of the cellular carrier 34. Subscription protocol is also optionally able to permit the user to select a particular service package, for example. Customer care system 34 more preferably collects such information as the identity of cellular telephone 12 or other user device, and one or more user preferences concerning the operation and/or delivery of the user application. This information is most preferably stored in a subscription preferences repository 36.

According to preferred embodiments of this implementation of the present invention, personalization service 44 also optionally and most preferably enables the user to filter one or more features of any received user application, also optionally and most preferably through some type of Web-based interface (such as a WAP micro-browser, for example).

While the invention has been described with respect to a limited number of embodiments, it will be appreciated that many variations, modifications and other applications of the invention may be made.

What is claimed is:

1. A method for provisioning a user application by a content provider for delivery to a range of limited resource devices through an integrated platform, comprising:

creating the user application by the content provider;

submitting the user application to the integrated platform by the content provider;

examining the user application by the integrated platform to validate the user application against respective predefined requirements of limited resource devices of said range and thereby to determine which of said range of limited resource devices the user application is compatible with; and if the user application is accepted, publishing the user application by the integrated platform, and enabling only those limited-resource devices found to be compatible with the user application, to download the user application;

wherein said range is greater than one, and publishing the user application includes adding the user application to a content directory, such that the user application forms a node of said content directory, and said content directory is divided into a plurality of categories, the user application being added to said content directory according to a plurality of said categories; such that the user application is reached through a plurality of paths in said content directory, such that a user browses for the user application through a plurality of paths of said content directory, using one of said categories.

2. The method of claim 1, wherein the limited resource device is a wireless communication device.

3. The method of claim 2, wherein the limited resource device is a cellular telephone.

4. The method of claim 1, wherein a service package for determining whether the user application is retrievable by the limited resource device is associated with at least one category.

5. The method of claim 1, wherein said node features at least one attribute for performing at least one of delivering the user application to the limited resource device, searching for user applications through said content directory and filtering user applications.

6. The method of claim 5, wherein said filtering is performed at least for determining whether the user application may be provided to the limited resource device.

7. The method of claim 6, wherein said filtering is performed according to at least one of supported types of limited-resource devices, languages and user eligibility for content.

8. The method of claim 5, wherein said filtering is performed for personalizing said content directory for display to the user.

9. The method of claim 1, wherein the user application is created in a plurality of flavors, each flavor being associated with a particular type of limited resource device.

10. The method of claim 9, wherein each flavor features at least one of an attribute for defining at least one supported type of limited resource devices and an attribute for defining at least one supported language of said flavor.

11. The method of claim 10, wherein said flavor is contained in a JAR (java archive) file.

12. The method of claim 1, wherein examining the user application includes validating at least one characteristic of the user application.

13. The method of claim 12, wherein if the user application is validated, examining the user application further includes testing at least one function of the user application.

14. The method of claim 13, wherein the user application is accepted only if said testing is successful.

15. A system for providing a user application to a range of limited resource devices, the system comprising:
(a) a limited resource device for receiving the user application;
(b) a content provider for creating the user application; and
(c) a service provider for examining the user application to validate the user application against respective predefined requirements of limited resource devices of said range, and thereby to determine usability of the user application by given limited resource devices of said range, and if the user application is accepted, publishing the user application, and enabling the downloading of the user application only by compatible limited resource devices belonging to said range;
wherein said range is greater than one, and wherein the service provider is further configured to publish the application by adding the user application to a content directory, such that the user application forms a node of said content directory, and said content directory is divided into a plurality of categories, the user application being added to said content directory according to a plurality of said categories; such that the user application is reached through a plurality of paths in said content directory, such that a user browses for the user application through a plurality of paths of said content directory, using one of said categories.

16. The system of claim 15, wherein said service provider further comprises a plurality of components, each component providing a service to at least one of said limited resource device and said content provider, wherein said plurality of components is organized according to at least one of a distributed manner and an integrated platform.

17. The system of claim 16, wherein said plurality of components is organized in said integrated platform, the system further comprising at least one service provider component for providing a service to said limited resource device.

18. The system of claim 17, wherein said service provider further determines a "flavor" of said user application for a particular type of limited resource device.

19. A method for aggregating a user application for delivery to a range of limited resource devices by a service provider, the limited resource devices having at least one characteristic, the method comprising:
submitting the user application to the service provider;
determining at least one rule for controlling the user application;
validating the user application against respective predefined requirements of limited resource devices of said range;
altering at least one function of the user application according to at least one characteristic of the limited resource devices of said range;
customizing the user application according to at least one rule by the service provider, and
allowing said user application to be downloaded to a compatible limited resource device of said range;
wherein said range is greater than one and publishing the user application includes adding the user application to a content directory, such that the user application forms a node of said content directory, and said content directory is divided into a plurality of categories, the user application being added to said content directory according to a plurality of said categories; such that the user application is reached through a plurality of paths in said content directory, such that user browses for the user application through a plurality of paths of said content directory, using one of said categories.

20. A method for provisioning a user application by a content provider for delivery to a range of limited resource devices, the method comprising:
providing a service provider for delivering the user application to the limited resource devices, said service provider being configured to validate the user application against respective predefined requirements of limited resource devices of said range;
creating the user application by the content provider;

determining at least one characteristic of the user application by the content provider;

submitting the user application to the service provider by the content provider, wherein at least one of creating the user application, determining the at least one characteristic of the user application, and submitting the user application is controlled by at least one rule determined by the service provider; and aggregating the user application by the service provider, thereby to render said application downloadable from said aggregation specifically to a limited resource device, belonging to said range, able to execute said application;

wherein said range is greater than one and publishing the user application includes adding the user application to a content directory, such that the user application forms a node of said content directory, and said content directory is divided into a plurality of categories, the user application being added to said content directory according to a plurality of said categories; such that the user application is reached through a plurality of paths in said content directory, such that a user browses for the user application through a plurality of paths of said content directory, using one of said categories.

* * * * *